US009927059B2

(12) United States Patent
Penza et al.

(10) Patent No.: US 9,927,059 B2
(45) Date of Patent: Mar. 27, 2018

(54) SYSTEM AND METHOD FOR PIPE INSERTION IN A PIPELINE

(71) Applicant: ULC ROBOTICS, INC., Hauppauge, NY (US)

(72) Inventors: G. Gregory Penza, Old Field, NY (US); Robert E. Kodadek, Long Beach, NY (US); Benjamin Lagosz-Sinclair, Brooklyn, NY (US); Michael Passaretti, Smithtown, NY (US); Jamie Sternlicht, Port Jefferson, NY (US); Eric S. Feldman, Glen Head, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 0 days.

(21) Appl. No.: 15/293,880

(22) Filed: Oct. 14, 2016

(65) Prior Publication Data

US 2017/0108155 A1  Apr. 20, 2017

Related U.S. Application Data

(60) Provisional application No. 62/241,372, filed on Oct. 14, 2015.

(51) Int. Cl.
*G01C 3/00* (2006.01)
*F16L 55/18* (2006.01)
(Continued)

(52) U.S. Cl.
CPC ........... *F16L 55/18* (2013.01); *F16L 55/1608* (2013.01); *F16L 55/30* (2013.01); *F16L 55/48* (2013.01); *G01S 17/08* (2013.01)

(58) Field of Classification Search
CPC .......... G01N 2035/00326; G01N 2035/00495; G01N 35/0092; G01N 2015/1006;
(Continued)

(56) References Cited

U.S. PATENT DOCUMENTS

| 4,685,983 A | 8/1987 | Long, Jr. |
| 5,621,531 A * | 4/1997 | Van Andel ............. G01B 11/27 33/286 |

(Continued)

FOREIGN PATENT DOCUMENTS

| DE | 3716568 A1 | 12/1988 |
| DE | 10031687 A1 | 1/2002 |

(Continued)

OTHER PUBLICATIONS

Extended European Search Report re European Patent Application No. 16193909.5 dated Feb. 7, 2017.

(Continued)

*Primary Examiner* — Michael P Stafira
(74) *Attorney, Agent, or Firm* — Brooks Kushman P.C.

(57) ABSTRACT

A system and method for pipe insertion in live gas mains includes isolating a section of the gas main and taking measurements of service line connection points. This data is then used to prepare a pipe to be inserted into the gas main by drilling holes and applying fittings at the appropriate locations. The prepared pipe is then inserted into the gas main and the service lines are connected to it without the need to excavate the street over each service connection. The inserted pipe is then fluidly connected to the cut ends of the gas main and gas flow is routed through the newly inserted pipe and the attached service lines, while gas continues to flow through the original portions of the gas main that still remain in service.

20 Claims, 13 Drawing Sheets

(51) Int. Cl.
*G01S 17/08* (2006.01)
*F16L 55/16* (2006.01)
*F16L 55/48* (2006.01)
*F16L 55/30* (2006.01)

(58) Field of Classification Search
CPC .............. G01N 35/026; G01N 35/10; G01N 35/00871; G01N 35/1065; G01N 33/54306; G01N 21/25; G01N 15/1475; G01N 21/27; G01N 2201/12
See application file for complete search history.

(56) References Cited

U.S. PATENT DOCUMENTS

| | | | |
|---|---|---|---|
| 6,092,553 A | 7/2000 | Hodgson | |
| 6,103,052 A | 8/2000 | Kamiyama et al. | |
| 6,286,542 B1 | 9/2001 | Morain et al. | |
| 6,427,784 B1 | 8/2002 | Archambeault et al. | |
| 7,042,555 B1 * | 5/2006 | Lawson | G01C 15/002 356/138 |
| 8,864,418 B2 | 10/2014 | Gagnon et al. | |
| 9,341,302 B2 | 5/2016 | Kiest, Jr. | |
| 9,581,281 B2 | 2/2017 | Volkel et al. | |
| 2002/0083976 A1 | 7/2002 | Beals et al. | |
| 2003/0077125 A1 | 4/2003 | Ploeg | |
| 2006/0213280 A1 | 9/2006 | Shimada | |
| 2009/0134554 A1 | 5/2009 | Goss | |
| 2012/0255664 A1 | 10/2012 | Lindner et al. | |
| 2012/0257042 A1 * | 10/2012 | McKaigue | G01N 21/954 348/84 |
| 2014/0311607 A1 | 10/2014 | Mathey et al. | |
| 2015/0146216 A1 * | 5/2015 | Krauhausen | B21C 51/00 356/612 |
| 2015/0168247 A1 | 6/2015 | Gundersen | |
| 2017/0108156 A1 | 4/2017 | Penza et al. | |

FOREIGN PATENT DOCUMENTS

| | | |
|---|---|---|
| EP | 0337031 A1 | 10/1989 |
| EP | 0344824 A1 | 12/1989 |
| EP | 0610620 A1 | 8/1994 |

OTHER PUBLICATIONS

Extended European Search Report in European Patent Application No. 16193914.5 dated Feb. 7, 2017.

* cited by examiner

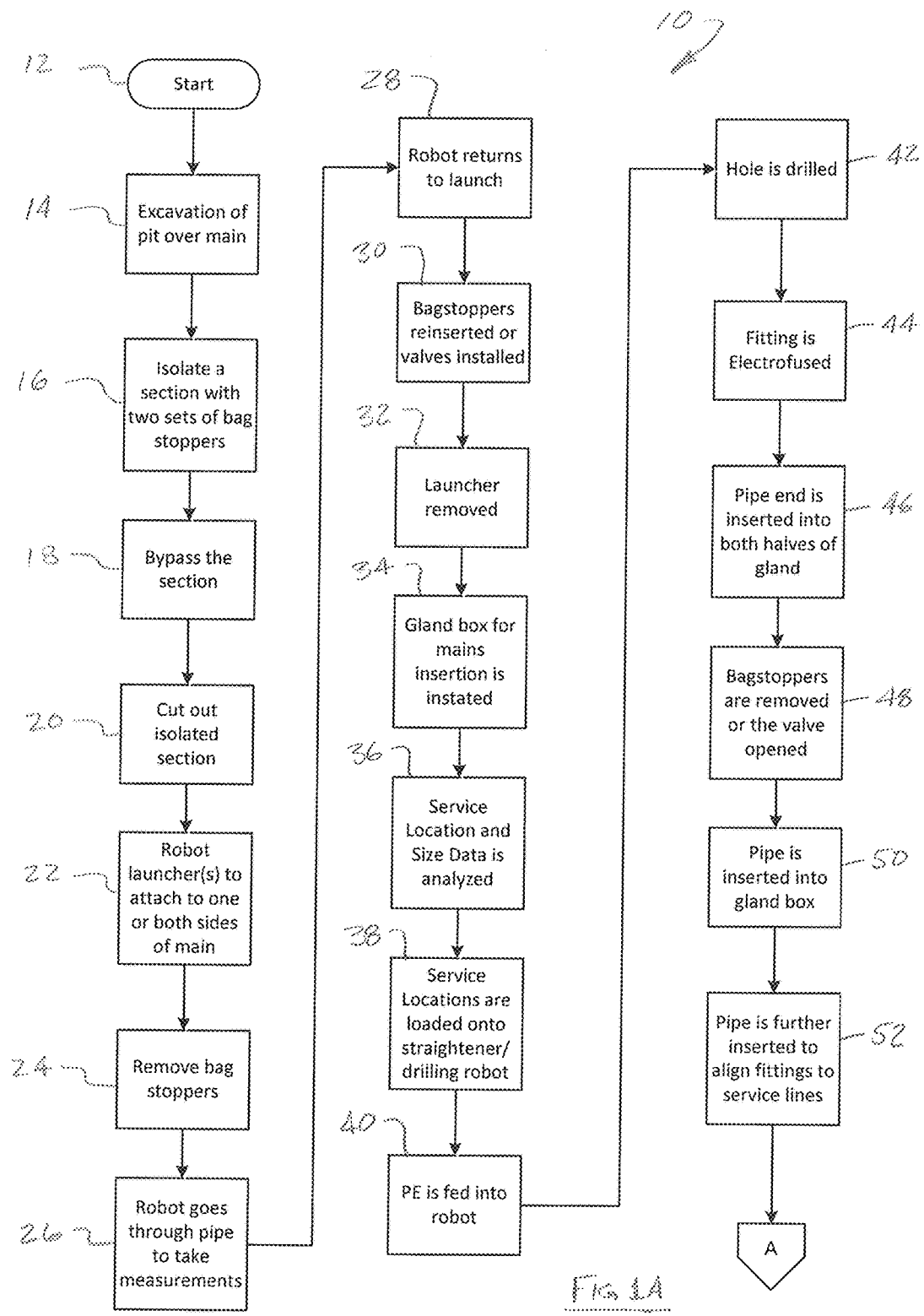

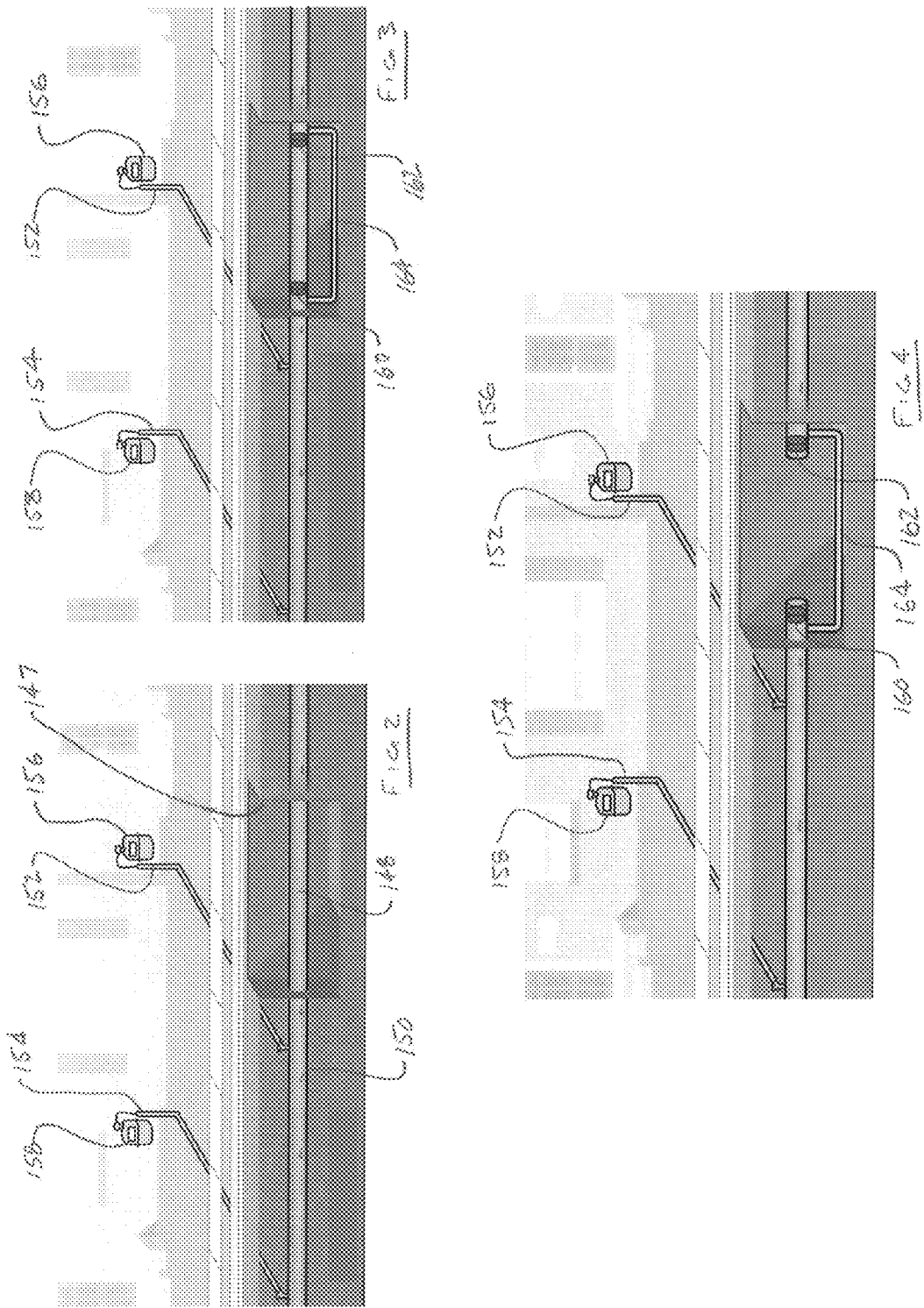

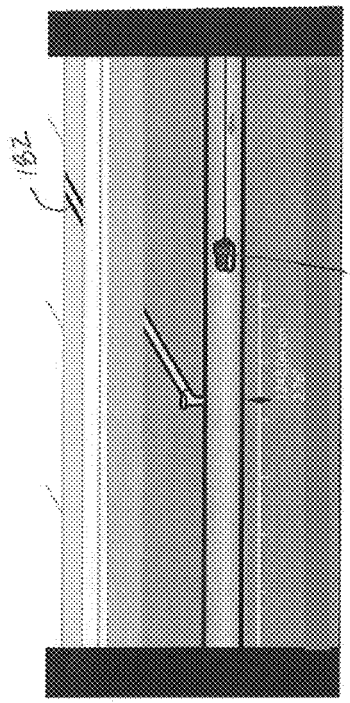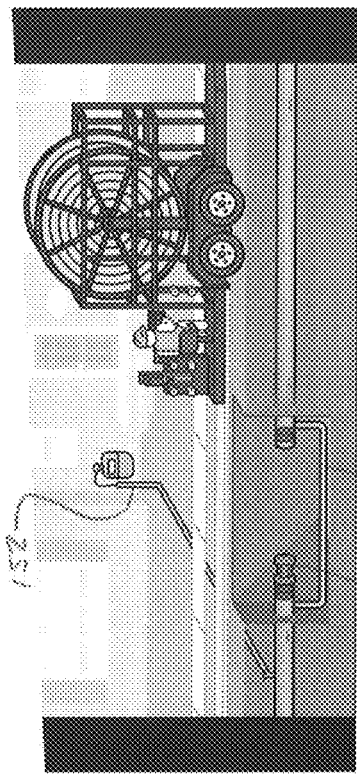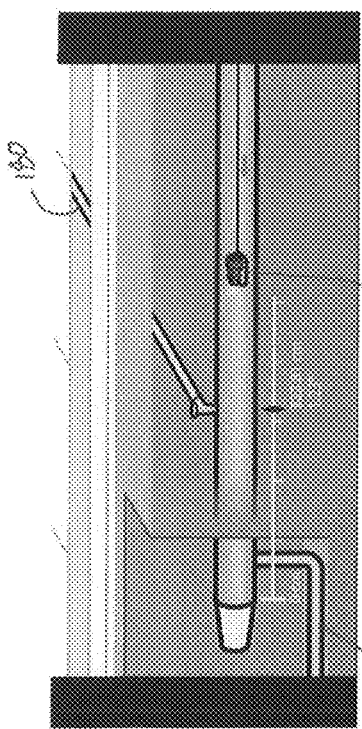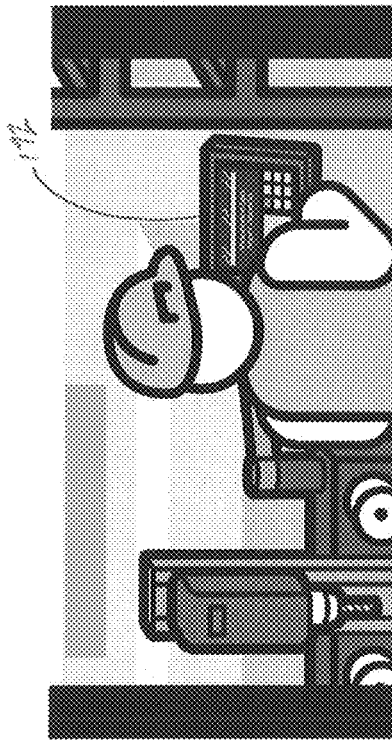

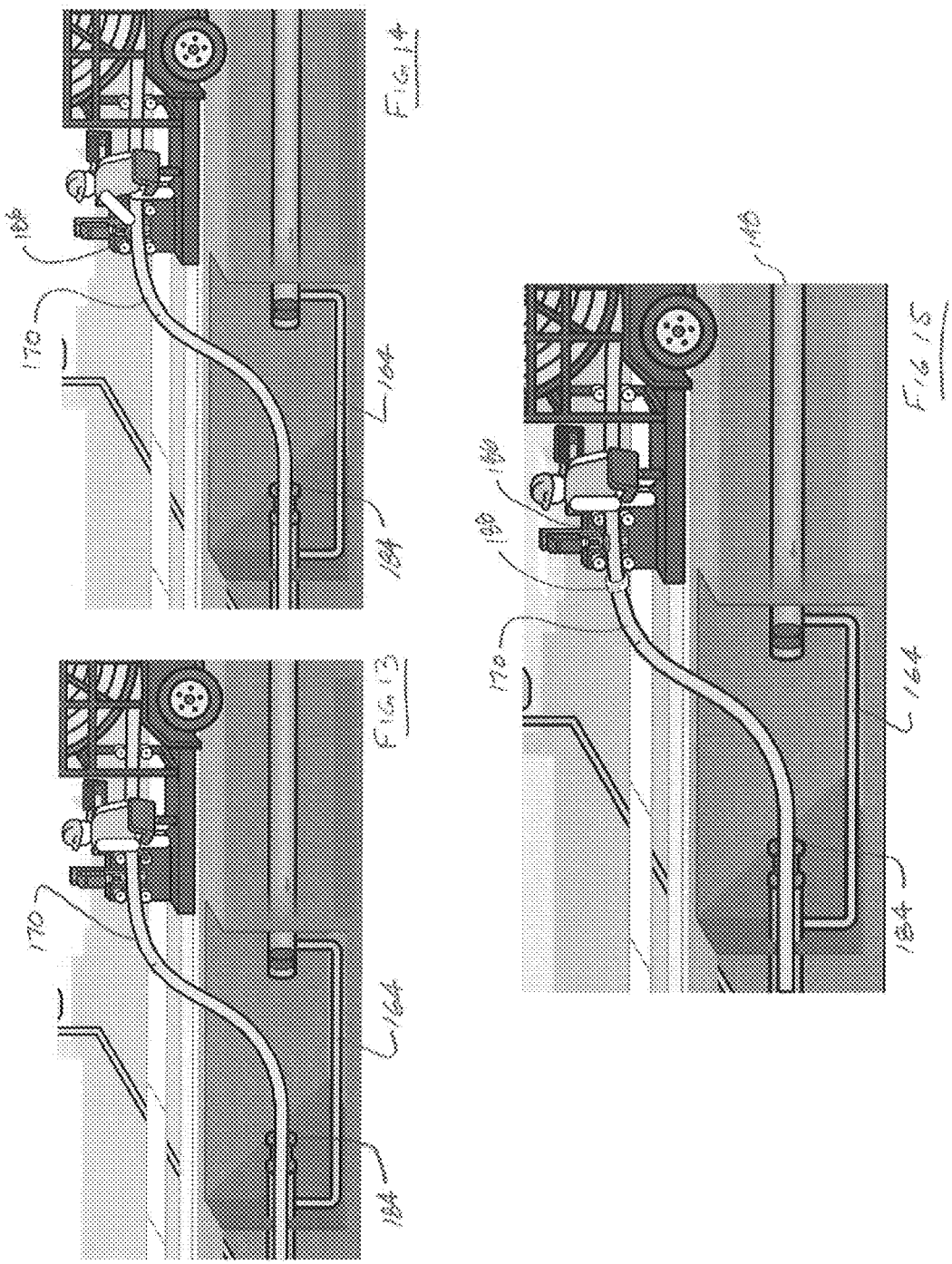

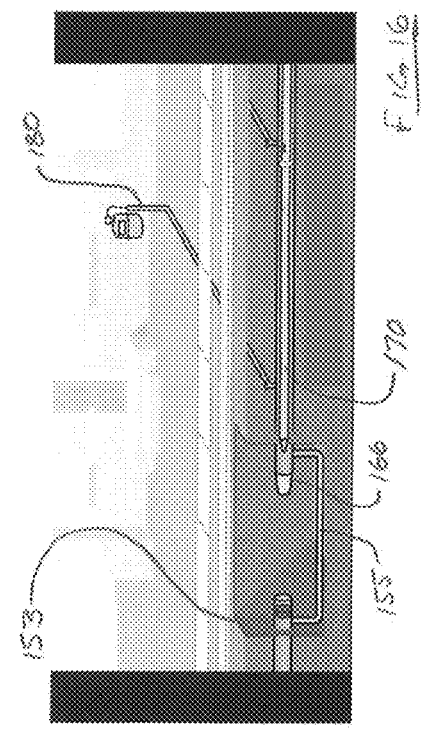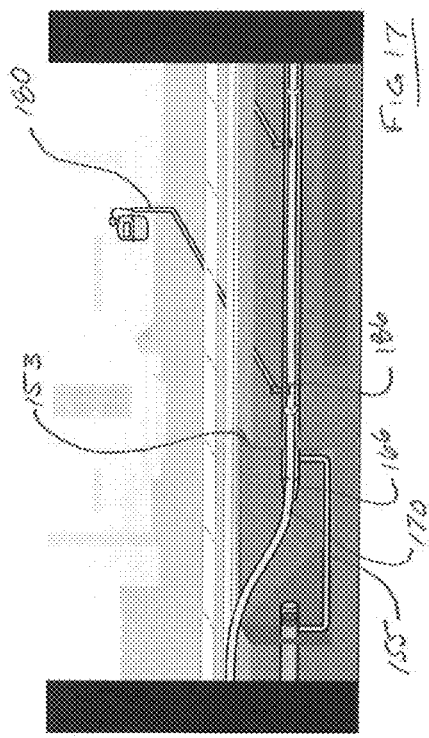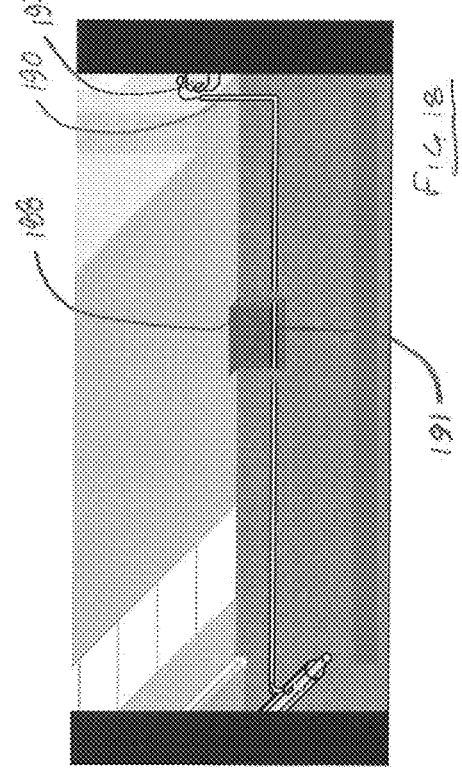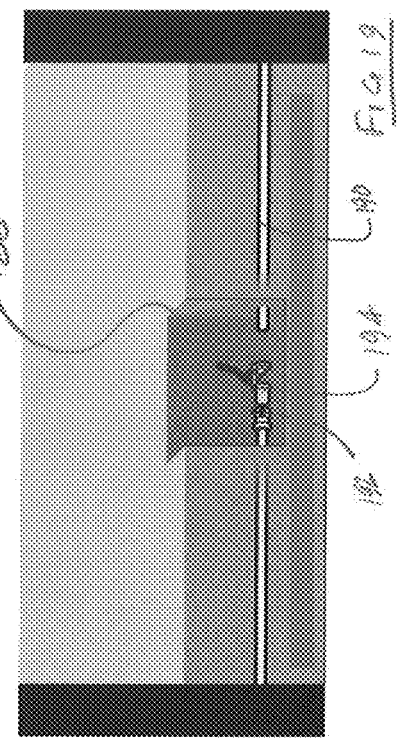

SYSTEM AND METHOD FOR PIPE INSERTION IN A PIPELINE

CROSS-REFERENCE TO RELATED APPLICATIONS

This application claims the benefit of U.S. provisional application Ser. No. 62/241,372 filed Oct. 14, 2015, the disclosure of which is hereby incorporated in its entirety by reference herein.

TECHNICAL FIELD

The present disclosure relates to a system and method for pipe insertion in live gas mains.

BACKGROUND

The replacement of gas distribution pipe typically requires the excavation of trenches into which the pipe is laid. Alternatively, a technique known as pipe insertion provides a means for the installation of distribution pipe with reduced excavation, resources, permits and reinstatement costs. Pipe insertion is the process of inserting a smaller pipe into an existing, larger one. It currently provides a means for gas companies to cost-effectively replace large sections of main without the typical disruptive excavations. A "dead insertion" is a technique where a pipe is temporarily disconnected from the existing gas distribution network. Excavations are made at suitable access points on the existing gas main. A cut-out of an excavated section of main is created and a new polyethylene (PE) pipe is pulled or pushed into the section of existing main.

Each excavation associated with a pipeline replacement results in traffic delays, road closures and noise that disrupt the public and drive-up project costs. The high project costs may eventually be passed along to the gas customers. To minimize disruptions to service, it would be desirable to have an in situ means of connecting newly inserted PE pipe to service lines to eliminate the need to excavate over the connection point with the main at each service.

SUMMARY

Embodiments disclosed herein provide a system and method for pipe insertion in live gas mains. In at least some embodiments, a replacement pipe, for example one made from polyethylene, is inserted into a cast-iron pipe in need of rehabilitation. To avoid disruption of service, embodiments may provide a system and method for inserting a PE pipe while gas is still flowing to the end-users. A gas main may be accessed by a small excavation such that a portion of the main can be removed and a bypass inserted. This same process may be used at a location farther down the gas main so that a section of the gas main in need of rehabilitation is accessible from both ends.

A robotic device is then inserted into the isolated section and measurements taken to determine the location and orientation of service connections along the gas main. This data is then used to prepare a PE pipe, which may include drilling holes in the PE pipe which correspond to the locations of each service connection as measured by the robotic device, attaching a fitting over each hole at the desired locations along the pipe—for example, by fusing the fitting to the pipe—and optionally attaching spacers on the outside of the pipe to keep it centered as it is inserted into the gas main. The prepared PE pipe is then inserted into the isolated section of the gas main. A small robotic device is then inserted into a flexible PE liner pipe sized appropriately to fit into the existing service line.

The small PE liner pipe is inserted into the existing service line, which may be accessed, for example, by disconnecting the service line from the meter and inserting the PE liner pipe at the disconnected service line pipe. Alternatively, a small excavation may be made off the roadway—e.g., in the grass, garden or front yard of the building—to access the service line leading to the main. The small PE line pipe is urged through the existing service line until the robotic device contacts and makes the connection with the fitting fused onto the PE pipe within the gas main. Prior to contacting the gas main, the robotic device may be used to cause the PE liner pipe to bend around one or more 90-degree elbows, which commonly comprise the service and the service tee. The robotic device can then be removed from the small PE liner pipe in the existing service line and final termination of the service line to, for example, a gas meter can then be made. This process is repeated for other service lines connected to the isolated portion of the gas main. Once this is complete, the two ends of the PE pipe inserted into the gas main are connected to their corresponding ends of the cut gas main. The bypasses previously inserted can now be removed and gas routed through the newly inserted PE pipe in the gas main and the service pipes connecting to it.

Embodiments described herein may include a method for measuring distance in a pipeline, including some or all of the following steps: a) disposing a first subsystem of a robotic measuring system into the pipeline at an opening in the pipeline; b) disposing a second subsystem of the robotic measuring system into the pipeline at a first position such that there is a line of sight between the first and second subsystems; c) actuating a measurement capture process by the robotic measuring system, the measurement capture process including generating a laser beam from one of the first or second subsystems and reflecting it from the other of the first or second subsystems to generate a distance measurement between the first and second subsystems; d) moving the first subsystem to a position closer to the second subsystem; e) actuating the measurement capture process; f) moving the second subsystem to a position away from the first subsystem such that there is a line of sight between the first and second subsystems; and g) actuating the measurement capture process.

Embodiments described herein may include a method for measuring distance in a pipeline, including a method for measuring distance in a pipeline. The method may include opening the pipeline at a first location and opening the pipeline at a second location disposed at a longitudinal distance from the first location. A first subsystem of a robotic measuring system may be disposed into the pipeline at a known location, and a second subsystem of the robotic measuring system may be disposed into the pipeline such that there is a line of sight between the first and second subsystems. A measurement capture process may be actuated by the robotic measuring system to generate a distance measurement between the first and second subsystems. The measurement capture process may include generating a laser beam from one of the first or second subsystems and reflecting it from the other of the first or second subsystems. The first and second subsystems may be alternately moved in the same direction along a length of the pipeline and the measurement capture process actuated after each movement of the first and second subsystems.

Embodiments described herein may include a system for measuring distance in a pipeline. The system may include a first subsystem of a robotic measuring system that includes a laser generator and is operable to move along an inside of the pipeline. A second subsystem of the robotic measuring system includes a reflector for reflecting a laser generated by the first subsystem and is operable to move along the inside of the pipeline. A locating arrangement is attached to one of the first or second subsystems and is configured to locate a feature of interest on the inside of a pipeline.

Embodiments described herein may include a system for pipe insertion into a pipeline. The system may include a service line robotic system having an actuator head arrangement defining a center line and movable along at least two axes transverse to the center line and configured for attachment to a flexible pipe such that an end of the flexible pipe moves along the at least two axes with the actuator head arrangement. A control system may be operatively connected to the actuator head arrangement and operable to move the actuator head arrangement along the at least two axes.

Embodiments described herein may include a system for pipe insertion into a pipeline. The system may include a service line robotic system having an actuator head arrangement configured to engage a flexible pipe and move the flexible pipe transversely relative to a longitudinal center line of the flexible pipe. A control system may be connected to the actuator head arrangement and operable to move the actuator head arrangement transversely relative to a longitudinal center line of the actuator head arrangement.

Embodiments described herein may include a method for pipe insertion into a pipeline that includes making a first excavation over a main pipeline to provide access to the main pipeline from above ground. A distance may be measured from a point in the first excavation to a service line connected to the main pipeline. A fitting may then be attached to a main liner pipe, and the main liner pipe inserted into the main pipeline through the first excavation until the fitting is aligned with the service line. The fitting may be attached on-site, off-site, or may be manufactured to specifications with the fitting placed at the desired location. A second excavation may be made over the service line to provide access to the service line from above ground, or access to the service line may be obtained by disconnecting the service line from a meter or some other above-ground fitting. A service line liner pipe may be inserted into the service line through the service-line access. A first end of the service line liner pipe may be manipulated through the service line and into the fitting attached to the main liner pipe.

BRIEF DESCRIPTION OF THE DRAWINGS

FIGS. 1A-1B show a flowchart illustrating a method in accordance with embodiments described herein;

FIG. 2 shows an initial excavation of a gas main;

FIG. 3 shows the insertion of a bypass line and stoppers into the gas main;

FIG. 4 shows removal of the cut section of the gas main;

FIG. 9 shows the measurement robot working its way back toward the insertion point measuring the linear and radial positions of service connections;

FIG. 10 shows further measurement by the measurement robot;

FIG. 11 shows the computer control unit receiving data from the measurement robot;

FIG. 12 shows a valve attached to the opening of the gas pipeline for insertion of the PE pipe;

FIG. 13 shows the PE pipe being inserted into the isolated section of the gas main, and the PE pipe to being drilled at the measured location of a service line;

FIG. 14 shows a fitting being fused onto the PE pipe at the location of the drilled hole;

FIG. 15 shows a spacer being fused onto the PE pipe at a location near the fitting;

FIG. 16 shows the PE pipe being inserted into the gas main;

FIG. 17 shows the insertion of the PE pipe being stopped at a position such that the fittings align with the service lines leading to the building;

FIG. 18 shows a small excavation of a service line leading to the gas main;

FIG. 19 shows a control valve and pipe pusher installed on the service line;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1B:
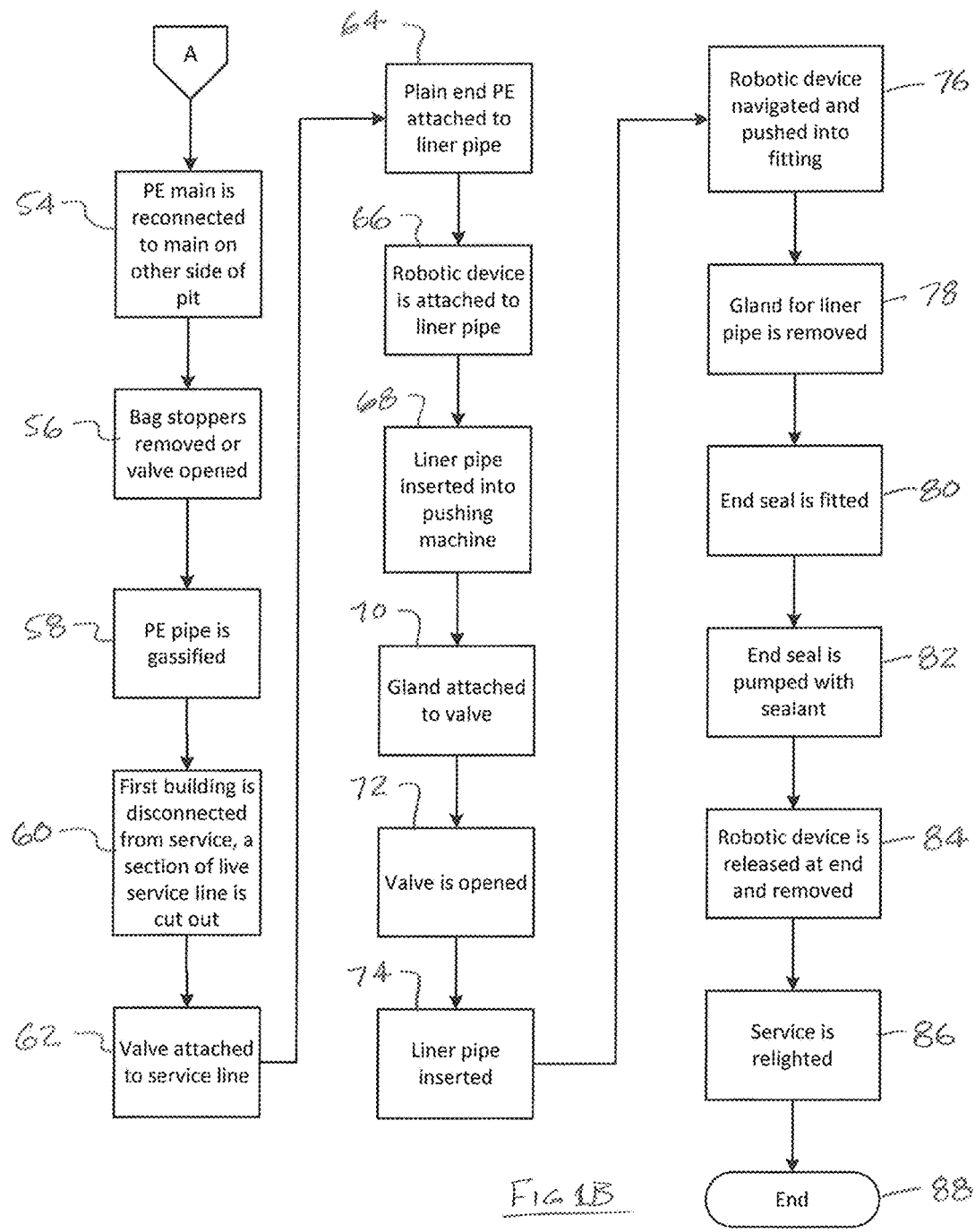
Figure 6:
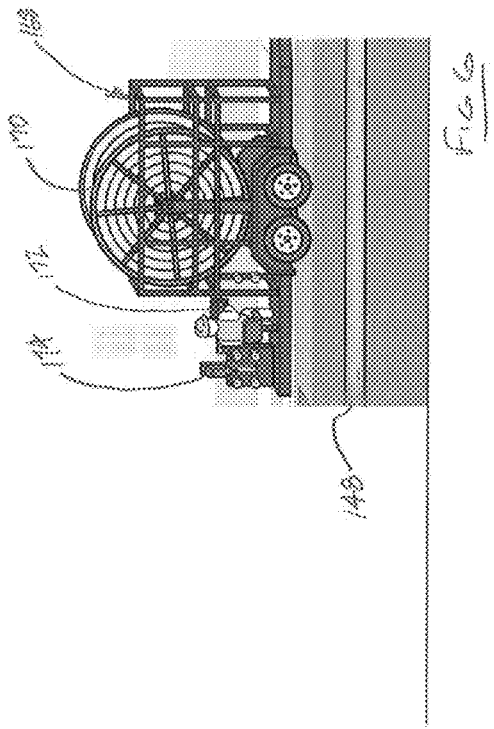
FIG. 6 shows a reel of polyethylene pipe on a mobile computer control unit in accordance with embodiments described herein.
Figure 5:
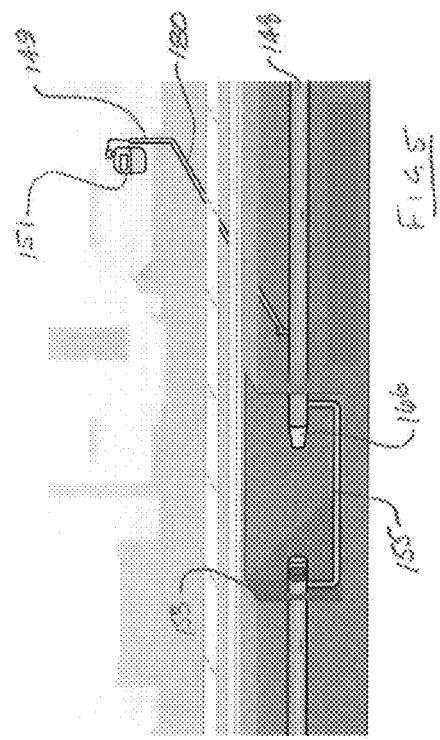
FIG. 5 shows a second section of the gas main excavated and bypassed downstream from the first cut section.
Figure 8:
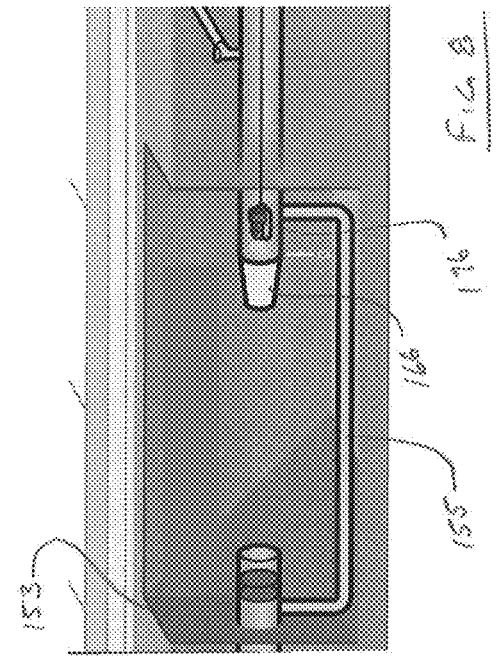
FIG. 8 shows the measurement robot at the end of the isolated section identifying a datum as a zero point for further measurements.

FIGS. 1A-1B show a flowchart 10 illustrating the steps in accordance with at least some embodiments described herein. The steps of the method 10 are now explained in more detail in conjunction with FIGS. 2-27. At step 14, an excavation 147 is made in the street to access a portion of a gas main 148 in order to isolate a section 150 of the gas main 148—see FIG. 2. Also shown in FIG. 2 are service lines 152, 154, which are respectively connected to gas meters 156, 158. FIG. 3 illustrates steps 16 and 18, wherein bag stoppers 160, 162 are inserted into the gas main 148, and a bypass 164 is also installed. FIG. 4 shows the section of the pipeline 148 removed as set forth in step 20. This process is essentially repeated at a point several meters downstream from the original excavation, except that a receiving gland 166 is inserted on one end of the gas main prior to removing the bag stoppers—see FIG. 5, showing a service line 149 connected to a gas meter 151. Another excavation 153 is made, a section of the main 148 is removed, and a bypass 155 is installed. Shown in FIG. 6 is a mobile computer control unit 168, which contains a reel of PE pipe 170, a computer control unit 172, and tools 174 for drilling and applying fittings to the PE pipe 170.

Figure 7:
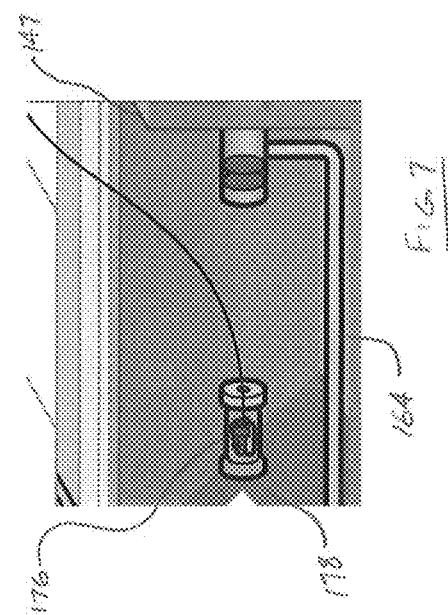
FIG. 7 shows a measurement robot ready for insertion into the gas main.

FIG. 7 shows a gas main measurement robot 176 ready for insertion into the gas main 148 at the site of the first excavation 147. The robot 176 is contained in a launch tube 178, which allows it to enter the pipeline 148 through a valve without allowing gas to escape. The measurement robot 176 is moved down to the end of the isolated section of the pipeline 148 until it reaches the receiving gland 166. Here, the measurement robot 176 identifies a zero datum, which may be the end of the pipe or some other convenient reference, as the basis for future measurements. In FIGS. 9 and 10, the measurement robot 176 is moving back down the pipeline 148 towards its entry point, and it is identifying the linear and radial locations of the service connections, for example service lines 180, 182, so that appropriate connections can be made with the PE pipe. This process is generally described in steps 22-28 in the flowchart 10.

As shown in FIG. 11, the data from the measurement robot 176 is analyzed by the computer control unit 172. FIG. 12 shows a gland box 184 attached to the cut end of the main 148. The gland box 184 allows insertion of the PE pipe 170 into the live gas main by maintaining a seal even as the PE pipe 170 is inserted through it. The gland box 184 may contain two walls which can be independently opened and closed, and which define an interior chamber. Alternatively, a gland box, such as the gland box 184, may contain one or more flanges with openings that conform to the shape of the PE pipe 170 and thereby form a seal. Either of these configurations allows entry of the PE pipe 170 into the main with a minimal release of gas to the ambient environment. Before or after a portion of the PE pipe 170 has been inserted into the gas main, a first service tap is drilled into the PE pipe 170 as shown in FIG. 13. A fitting 186 is then fused onto the PE pipe 170 at the point of the drilled hole as shown in FIG. 14. At a location near the fitting 186, a spacer 188 may also be attached—for example by fusing—to the outside of the PE pipe 170; this helps to keep the PE pipe 170 centered within the gas main 148 after it has been inserted.

In the embodiment shown in FIG. 13, the attachment of the fittings, the drilling operation, and the attachment of spacers takes place on-site; however, in other embodiments, a pipe, such as the PE pipe 170, may have fittings and spacers attached and holes drilled off-site so that it is ready to be inserted when it is delivered to the work site. A liner pipe may even be manufactured with fittings, spacers, or both, positioned at desired locations. At a minimum, a liner pipe may be manufactured with apertures—e.g., round holes, square holes, slots, etc.—disposed at predetermined locations in a wall of the liner pipe. In its simplest form, the fitting may be an aperture only, but will often include a seal for the connection to a service line liner pipe as described below. Apertures or other elements of the fittings may be performed, for example, in one or more secondary manufacturing operations after the tubular portion of the liner pipe is extruded or otherwise formed. And although polyethylene pipe is used in this example as the liner pipe, other embodiments may use liner pipes made from different materials.

Once all of the holes are drilled, and the fittings and spacers fused onto the PE pipe 170, the PE pipe is inserted into the gas main as shown in FIG. 16. Alternatively, the holes may be drilled, the fittings may be fused onto the PE pipe 170, and the pipe may be inserted into the gas main in one continuous operation. The PE pipe 170 may be allowed to exit through the receiving gland 166 until the fittings are aligned with the service lines—see, e.g., FIG. 17 showing the fitting 186 aligned with the service line 180. This process is described more specifically in the flowchart 10 at steps 30-56. As described in step 58, the PE pipe 170 can now be connected to the cut ends of the gas main and the PE pipe 170 gasified; alternatively, this step can be performed later in the process. The same is true for at least many of the other steps illustrated in the flowchart 10—that is, many of them do not need to be performed in the precise order illustrated in the flowchart; rather, variations are contemplated within different embodiments described herein.

FIG. 18 shows a small excavation 188 made at a convenient location to access a service line 190. A section 191 of the service line 190 is removed, and a control valve 192 and a pipe pusher 194 are attached to the downstream side of the service line 190—see FIG. 19. Alternatively, the service line 190 may be accessed by disconnecting it from the meter 193, shown in FIG. 18. In some cases, the meter may be inside a building, but it may still be possible to access the service line by disconnecting it from the meter. When the service line is disconnected from a meter, such as the meter 193, a control valve and pusher may still be attached to the service line, such as illustrated and described in conjunction with FIG. 19.

Figure 21:
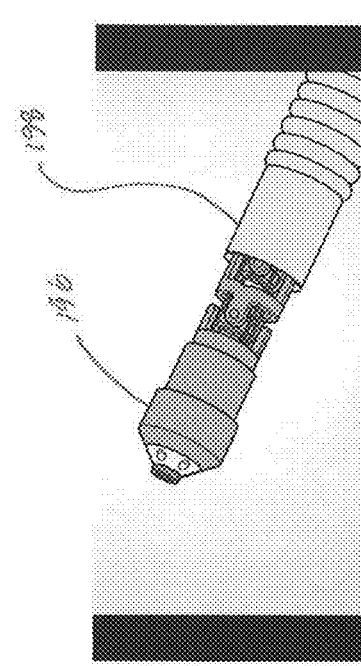
FIG. 21 shows the robotic device being inserted into a small-diameter flexible PE pipe.
Figure 23:
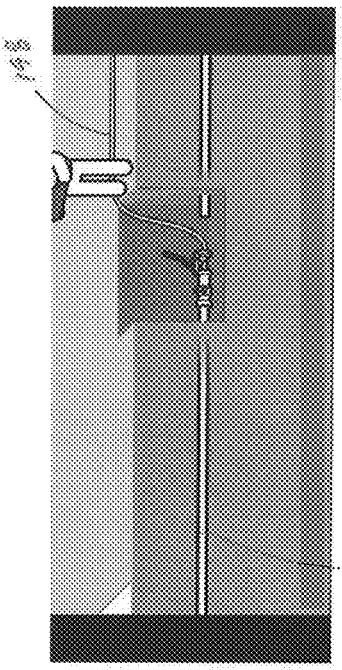
FIG. 23 shows the robotic device and small-diameter PE pipe being inserted into the service line.
Figure 20:
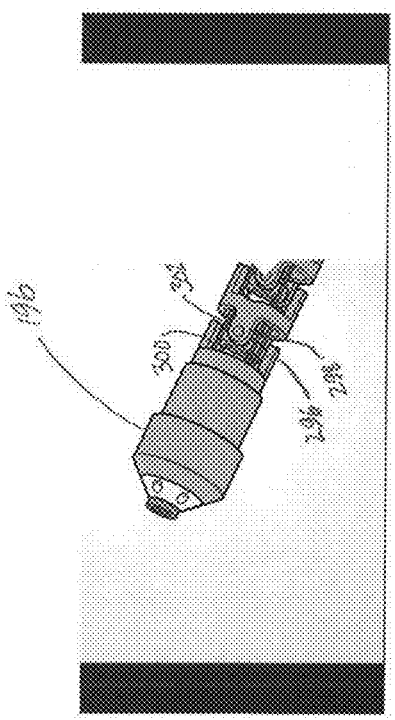
FIG. 20 shows a robotic device for use in conjunction with connecting the service line to the gas main.
Figure 22:
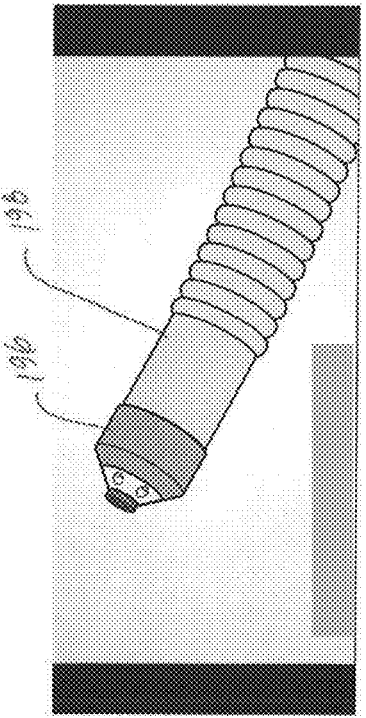
FIG. 22 shows the robotic device connected to the flexible small-diameter PE pipe.
Figure 25:
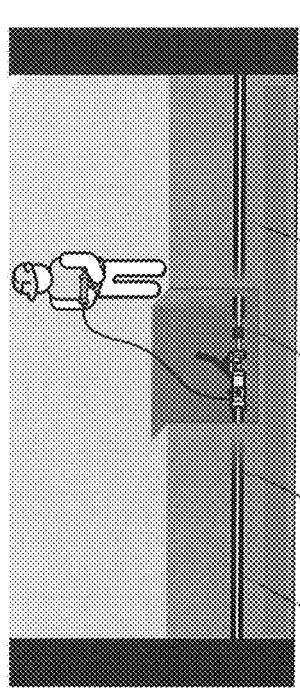
FIG. 25 shows the annular space around the small-diameter PE pipe in the service line being filled with a sealant.

FIG. 20 shows a remote service line connection robot 196, and FIG. 21 shows a small-diameter PE pipe 198 being inserted over a portion of the robot 196. The robot 196 and PE pipe 198 are shown after connection in FIG. 22. The robot-end of the PE pipe 198 is then inserted into the service line 190 as shown in FIG. 23. The robot 196 is articulated to navigate until it reaches a fitting 200, which has been previously fused into the PE pipe 170 as described above. The robot 196 facilitates the connection between the fitting 200 and the small-diameter PE pipe 198; the robot 196 is then removed. The annular space between the small-diameter PE pipe 198 and the service line 190 is filled with a sealant—which may be a caulk, grout or other material—as shown in FIG. 25. Also shown in FIG. 25, a splice 202 is made to connect a second piece 204 of the small-diameter PE pipe such that it can be connected to the gas meter or other building connection.

Figure 26:
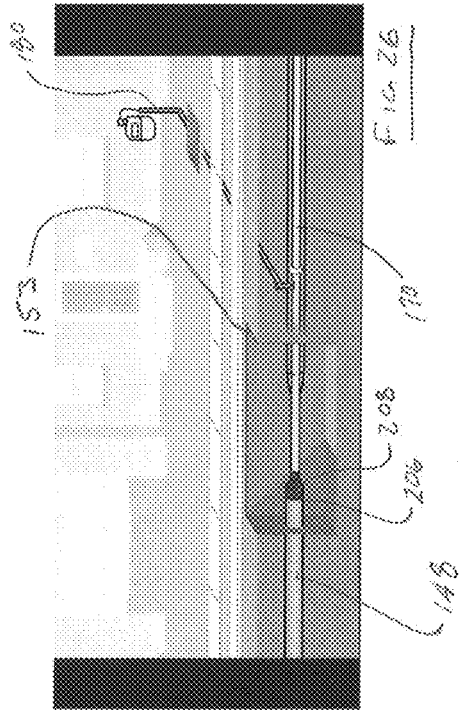
FIG. 26 shows the downstream end of the PE pipe inserted into the main connected to the cut section of the gas main adjacent to it.
Figure 27:
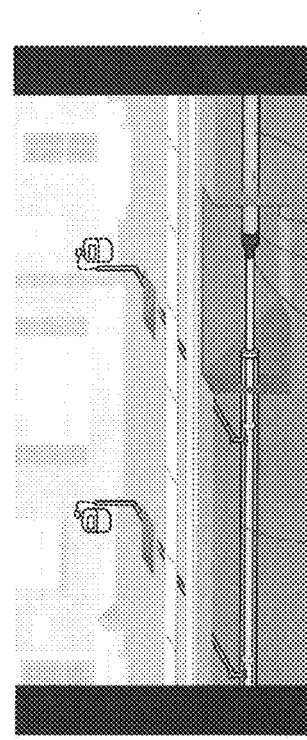
FIG. 27 shows the upstream end of the PE pipe inserted into the main connected to the cut section of the gas main adjacent to it so that gas is now able to flow through the PE pipe.

Shown in FIG. 26 is the service line 180 after it has been connected to the PE pipe 170 in the gas main. A pressure test of the service line 180 may now take place, for example, via a membrane in the fittings or a stopper. Also shown in FIG. 26, the PE pipe 170 has been connected to the cut-end 206 with a fitting 208 so that gas can flow through the PE pipe 170 and the remainder of the gas main 148 that is still usable. Similarly, at the first excavation 147, the PE pipe 170 is also connected to the other cut-end 210 of the gas main 148 with another of the valves 208. Gas can now be routed through the good portions of the original gas main 148 and through the newly inserted PE pipe 170 and the small-diameter PE pipe leading up to each of the service connections—e.g., the PE pipe 198, 204 shown in FIG. 25. The steps of connecting the service lines and finalizing the connection of the gas main are described in more detail in steps 60-86 of the flowchart 10.

Figure 28:
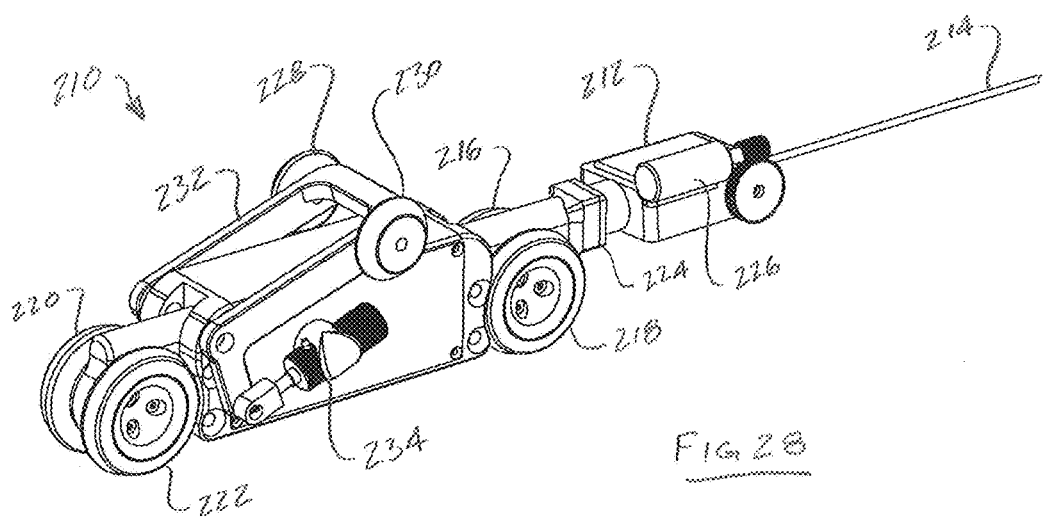
FIG. 28 shows a perspective view of a subsystem of a robotic measuring system operable to emit a laser beam to provide linear measurements.

In FIG. 7, a measurement robot 178 was illustrated and described as a way to provide measurements along the pipeline 148 to locate the connection points of the service lines—e.g., the service lines 152, 158, etc. In at least some embodiments, a robotic measuring system may include two subsystems that work together to provide the desired measurements. FIG. 28 shows a first subsystem 210 of a robotic measuring system. The subsystem 210 includes a laser generator module 212 configured to generate a laser beam 214. A set of drive wheels 216, 218 are operable to move the subsystem 210 along an inside of a pipeline, such as the pipeline 148. In the embodiment shown in FIG. 28, wheels 220, 222 are driven, but in other embodiments may also be drive wheels. The laser generator 212 is mounted on a two-piece gimbal drive 224, 226, which provides an angular adjustment for the laser generator 212.

The first subsystem 210 also includes a pair of idler wheels 228, 230. The idler wheels 228, 230 are mounted on a pivoting support structure 232, which may be pivoted by a pneumatic actuator 234. In this way, the idler wheels 228, 230 are adjustable away from the drive wheels 216, 218 to bring the idler wheels 228, 230 into contact with the opposite side of the pipeline from the drive wheels 216, 218. In the embodiment shown in FIG. 28, the idler wheels 228, 230 are located between the drive wheels 216, 218 and the driven wheels 220, 222, and provide an opposing force that stabilizes the subsystem 210 in the pipeline.

Figure 29:
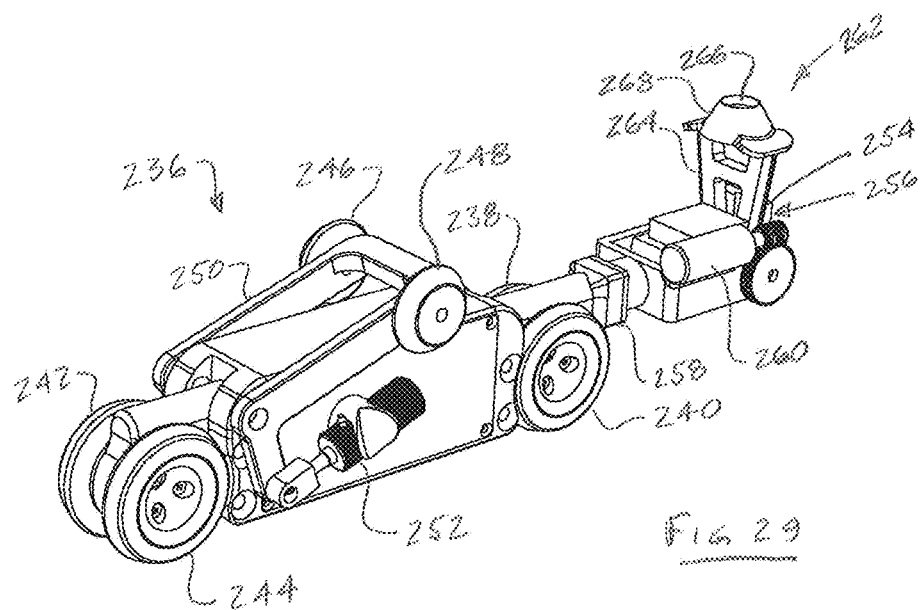
FIG. 29 shows a perspective view of another subsystem of the robotic measuring system equipped with a reflector to work in conjunction with the subsystem shown in FIG. 28 to provide various measurements.

FIG. 29 shows a second subsystem 236 making up a part of the robotic measuring system. Similar to the first subsystem 210, the second subsystem 236 includes a set of drive wheels 238, 240, a set of driven wheels 242, 244, and a set of idler wheels 246, 248. The idler wheels 246, 248 are also mounted on a pivoting support structure 250, which is pivoted by a pneumatic actuator 252. As described in more detail below, the second subsystem 236 works in conjunction with the first subsystem 210 to provide measurements of features of interest in a pipeline, such as the pipeline 148. The second subsystem 236 includes a reflector 254 and an array of photo sensors 256 positioned proximate to the reflector 254. The reflector 254 is configured to receive the laser beam 214 and reflected back so that an accurate measurement can be made of the distance between the first and second subsystems 210, 236.

The reflector 254 and photo sensor array 256 are mounted on a two-piece gimbal drive 258, 260. The gimbal drive also provides angular adjustment for the reflector 254 and photo sensor array 256, so that a direct line of sight between the laser beam 214 and the reflector 254 can be achieved. If the laser beam 214 is not centered on the reflector 254, one or more of the photo sensors 256 will be hit by the laser beam 214, and appropriate adjustment can be made to one or both of the laser generator 212 or the reflector 254.

The second subsystem 236 also includes a locating arrangement 262 attached to it that is configured to locate a feature of interest inside a pipeline, such as the pipeline 148. In the examples illustrated and described above, a feature of interest may be, for example, a connection point of a service line to the pipeline. In the embodiment shown in FIG. 29, the locating arrangement 262 is configured as an elongated member 264 having an aperture 266 disposed therethrough to allow gas to pass through the aperture 266 when the elongated member 264 is disposed over a connection point between a service line in the pipeline. The elongated member 264 also includes a conical top portion 268, which further facilitates positively identifying a service line connection point. As the second subsystem 236 is moved along the inside of a pipeline, the elongated member 264 contacts an inside wall of the pipeline and the conical top portion 268 enters into the opening of a service line connection point. This provides the operator a radial location of the service line connection. In this way, at least some embodiments of the robotic measuring system can provide both linear and radial measurements.

There are a number of ways in which a robotic measuring system having first and second subsystems, such as the subsystems 210, 236, can be used effectively for pipe insertion into a pipeline and connections to service lines such as described above. Of course, it is understood that this application is not the only situation in which such robotic measuring system is effective or desirable. Almost any application where accurate linear measurement is desired, and in particular, where access to the measured location is difficult, such a robotic measuring system may be effective and desirable. For purposes of describing a method of using such a robotic measuring system, the previous application of inserting a pipe into a pipeline and connecting it with service connections will be used as an example.

As shown in FIG. 2, a first excavation 147 is made to access the pipeline 148. A section of the pipeline 148 is removed and the appropriate plugs and bypass installed—see FIG. 4. At some distance along the pipeline 148—for example several meters, or in some cases approximately 100 m—a second excavation 153 is made. Here a section of the pipeline 148 is also removed and the appropriate plugs and bypass installed. In the following description of methods for using the first and second subsystems 210, 236, one of the subsystems 210, 236 will be initially placed at a known position—e.g., at one of the openings in the pipeline 148—while the other of the subsystems 210, 236 is placed at some distance away when the measurements are taken and the process begins. It is understood, however, that the roles of the two subsystems 210, 236 could be reversed, and this will be apparent from the following description.

In at least one embodiment, the first subsystem 210 is disposed in the pipeline 148 at an opening in the pipeline such as, for example, would be accessible at the second excavation 153. The second subsystem 236 is disposed into the pipeline 148, for example, at an opening accessible at the first excavation 147. The second subsystem 236 is driven down the pipeline 148 until it is within a desired distance from the first subsystem 210. More particularly, the second subsystem 236 will be positioned relative to the first subsystem 210 to ensure that there is a direct line of sight between the first and second subsystems 210, 236. In at least some examples, this may be approximately 3 m. A measurement capture process is then actuated, by generating the laser beam 214 such that it reflects from the reflector 254 to generate a distance measurement between the first and second subsystems 210, 236.

After this first distance measurement is taken, the first subsystem 210 is moved to a position closer to the second subsystem 236, which in some examples may be approximately 0.5 m. The measurement capture process is again actuated and the distance between the two subsystems 210, 236 is measured. Next, the second subsystem 236 is moved to a position away from the first subsystem 210 such that there is still a line of sight between the first and second subsystems 210, 236. In at least some situations this may again be approximately 3 m. The measurement capture process is again actuated and a distant measurement taken. These steps are repeated wherein the first subsystem 210 moves close to the second subsystem 236, a measurement is taken, and then at the second subsystem 236 moves farther away while still maintaining a line of sight, and another measurement is taken. The stepwise method described above alternately moves the first and second subsystems 210, 236 along a length of the pipeline and actuating the measurement capture process after each movement of the first and second subsystems 210, 236.

Figure 30:
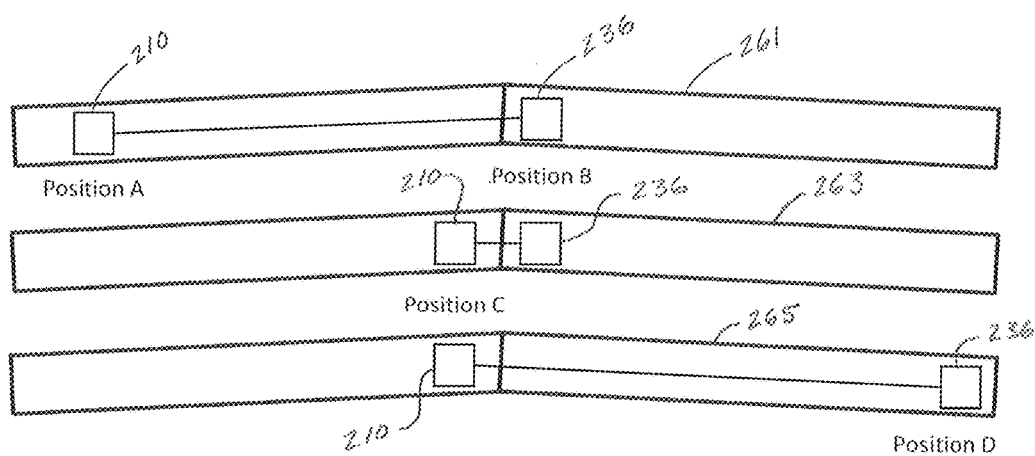
FIG. 30 shows a schematic illustration of a stepwise process for determining linear measurements using the robotic measuring system.

After the final movement of the second subsystem 236, the measurements comprise a series of long and short measurements. The distance from the starting point of the first subsystem 210—for example, at the opening of the pipeline in the second excavation 153—to the location of the second subsystem 236 is calculated by mathematically combining all of the distant measurements previously taken. More specifically, all of the long measurements are added and all of the short measurements are subtracted, and the desired distance is determined. This concept is illustrated schematically in FIG. 30. In the first step 261, "Position A" is occupied by the first subsystem 210 and "Position B" is occupied by the second subsystem 236. After this measurement is obtained, the first subsystem 210 moves to a new position—i.e., "Position C"—while the second subsystem 236 remains at Position B and another measurement is taken—this is shown in step 263. Finally, the second subsystem 236 moves away from the first subsystem 210 to a location designated as "Position D"—this is shown at step 265. The desired distance "AD" is obtained from the following equation: AD≈AB+CD−CB.

As described in detail above, connecting the fittings to the PE pipe, such as the PE pipe 170, at the appropriate locations requires knowledge of where the service lines connect to the pipeline 148. This is where the locating arrangement 262 can be used. For example, as the second subsystem 236 is moving away from the first subsystem 210 during one of the iterations of measurement described above, the locating arrangement 262 may, upon a service line connected to the pipeline 148. When this happens, the second subsystem 236 stops and a line of sight between the laser beam 214 and the reflector 254 is established. A measurement is taken and the position of the locating arrangement 262 relative to the opening in the pipeline 148 at the second excavation 153 can then be determined as described above. This distance can be used to appropriately place a fitting onto the PE pipe 170. The PE pipe 170 can then be inserted into the pipeline 148 so that the fitting aligns with the service line connection point.

Figure 31:
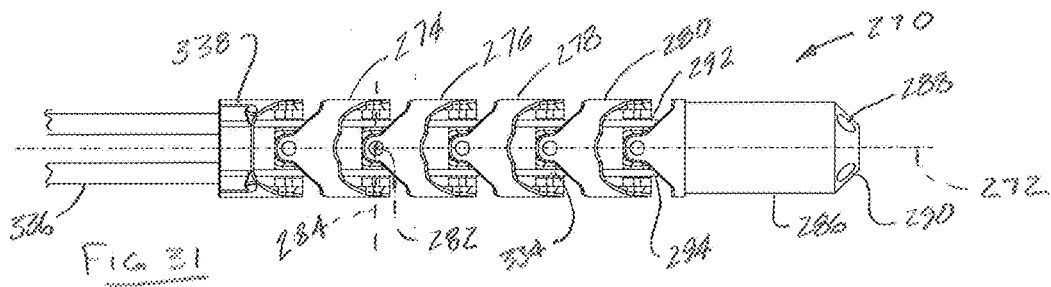
FIG. 31 shows an actuator head arrangement as part of a service line robotic system.

Once a fitting, such as the fitting 186 is aligned with a service line, such as the service line 180—see FIG. 17, a service line robotic system can be used. One such system that included a remote service line connection robot 196 was described above and illustrated in conjunction with FIGS. 20-24. FIGS. 30-34 show another embodiment of a service line robotic system that may be used for pipe insertion into a pipeline such as described above. An actuator head arrangement 270 forming part of a service line robotic system is shown in FIG. 31. The actuator head arrangement defines a center line 272, which is a longitudinal centerline of the actuator head arrangement 270. Although it is shown as being straight in the illustration shown in FIG. 31, the actuator head arrangement 270 is movable along at least two axes transverse to the centerline 272, and it is understood that the centerline 272 will at times be curved.

The actuator head arrangement 270 includes several pivotable sections 274, 276, 278, 280, which, in the embodiment shown in FIG. 31, are configured as "universal joints" and pivot around two axes perpendicular to the centerline 272. For example, the pivotable section 276 is pivotable about an axis 282, which is directed into the page as shown in FIG. 31, and an axis 284, which is vertical as shown in FIG. 31. Although the transverse axes 282, 284 are perpendicular to the centerline 272, in other embodiments and actuator head arrangement, such as the actuator head arrangement 270 may be movable in other directions. At the front and of the actuator head arrangement 270, is a nose section 286, which includes at least one camera 288 and at least one light 290.

Figure 32:
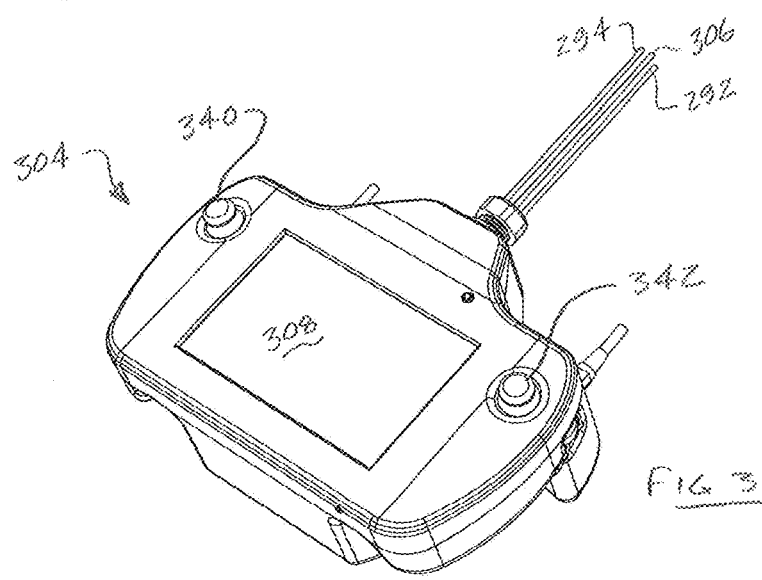
FIG. 32 shows a portion of a control system that can be used for controlling the actuator head arrangement.

Shown by the partial cut-away view of FIG. 31 are control cables 292, 294. Although only two of the cables 292, 294 are visible in FIG. 31, it is understood that two other similarly configured control cables are disposed directly behind the cables 292, 294—see, also, FIG. 20 where four control cables 296, 298, 300, 302 are shown. The service line robotic system also includes a control system 304 as shown in FIG. 32. The control system 304 is connected to the actuator head arrangement 270 through the control cables 292, 294, 306, and one other control cable not visible in FIG. 32. The control system 304 includes a display 308 operatively connected to the camera 288 to provide visual feedback to an operator from the camera 288. Communications between the control system 304 and the camera 288 may be facilitated by an electrical cable running adjacent to the control cables 292, 294, 306. The electrical cable may facilitate video transmission between the display 308 and the camera 288; it may also provide control communications and even power for the camera 288 and the light 290. Similar to the robot 196 illustrated in FIG. 20, the actuator head arrangement 270 is configured for attachment to, and more specifically for insertion into, a flexible pipe, such as the smaller diameter PE pipe 198. This is the pipe that will be inserted through a service line, such as the service line 190.

Figure 33:
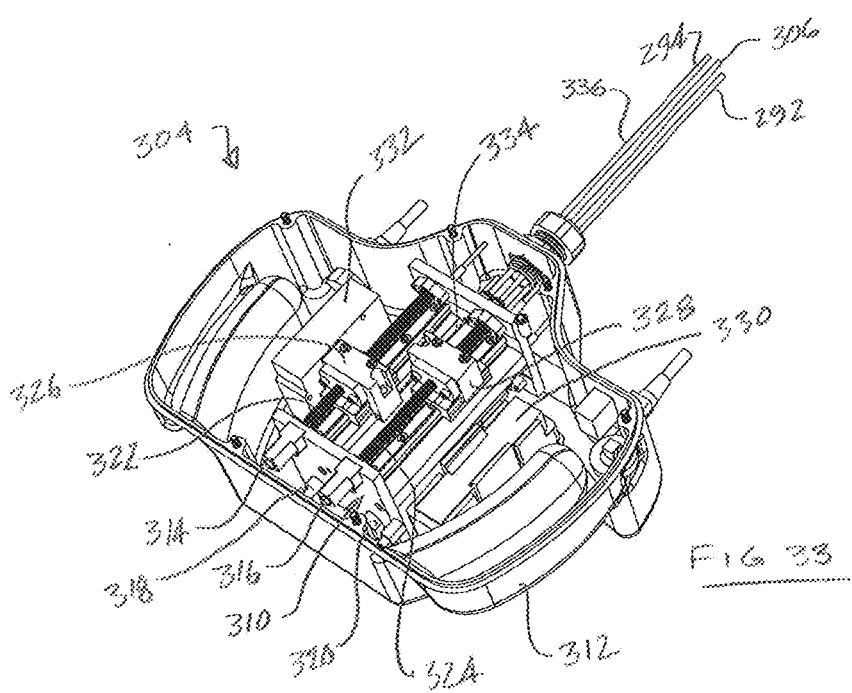
FIG. 33 shows detailed workings of the control system shown in FIG. 32.

FIG. 33 shows the control system 304 with the display 308 removed for visibility of some of its features. The control system 304 includes a support structure 310 made up of a number of plates and other structural members mounted inside a housing 312. Each of the control cables 292, 294, 306, and the fourth control cable are connected to the support structure 310 at one end, and the actuator head arrangement 270 at the other end. As noted above, an electrical cable for communications, power, or both, also runs between the control system 304 and the actuator head arrangement 270. The control system 304 is configured to selectively apply tension to and release tension from at least some of the control cables to move the actuator head arrangement 270 transversely to the centerline 272, for example, along the two axes 282, 284. To effect the application and release of tension on the control cables, the control system 304 includes four motors 314, 316, 318, 320. The motors 314, 316 turn respective drive screws 322, 324, which in turn move respective carriages 326, 328 linearly because the carriages 326, 328 have drive nuts inside their housings.

Also shown in FIG. 33 as a battery 330 used to provide power to the motors 314, 316, 318, 320, and various control and drive electronics 332, which may contain one or more microprocessors, memory, firmware, software or some combination of these. Each of the control cables includes a wire surrounded by a sheath. For example, the cable to 294 includes a wire 334 visible inside the housing 312 and a sheath 336 outside the housing 312. Similarly, FIG. 31 shows the wire portion 334 of the cable to 94 disposed within the pivotable sections 274, 276, 278, 280, while the sheath portion 336 is shown outside the pivotable portions to 74, 276, 278, 280. In fact, the sheaths from the control cables terminate at a back section 338 of the actuator head arrangement 270. To manipulate the actuator head arrangement 270, and therefore the end of a flexible pipe, such as the PE pipe 198, it is the inner wires of the control cables that are tensioned or released from tension.

As shown in FIG. 32, the control system 304 includes a pair of manipulators 340, 342, which in this embodiment are joysticks movable along to perpendicular axes. In order to move the actuator head arrangement 270 in a particular direction, the pair of cables disposed toward the direction of movement have tension applied to them, while the two opposing cables have tension released from them. The joystick 342 can be actuated to apply tension to or release tension from the two cables 292, 306, while the joystick 340 can be actuated to apply tension to or release tension from the cable to 94 and the fourth cable disposed behind the cable 306. Moving the joysticks 340, 342 along the opposite axes, however, manipulates different pairs of cables so that the actuator head arrangement 270 can be articulated up and down, as well as left and right.

Figure 34:
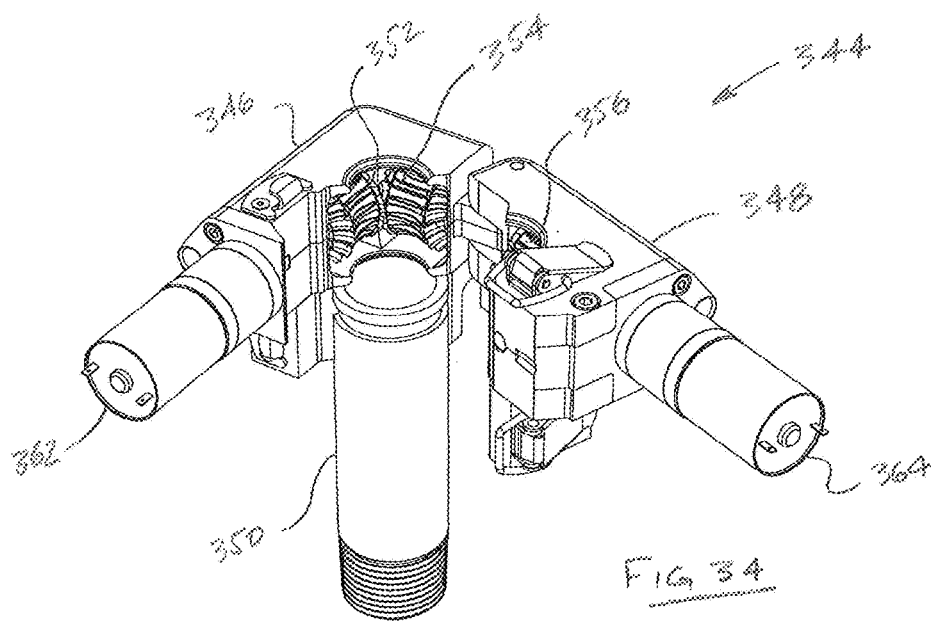
FIG. 34 shows a perspective view of a feeder system for feeding a flexible pipe in accordance with embodiments described herein.
Figure 35:
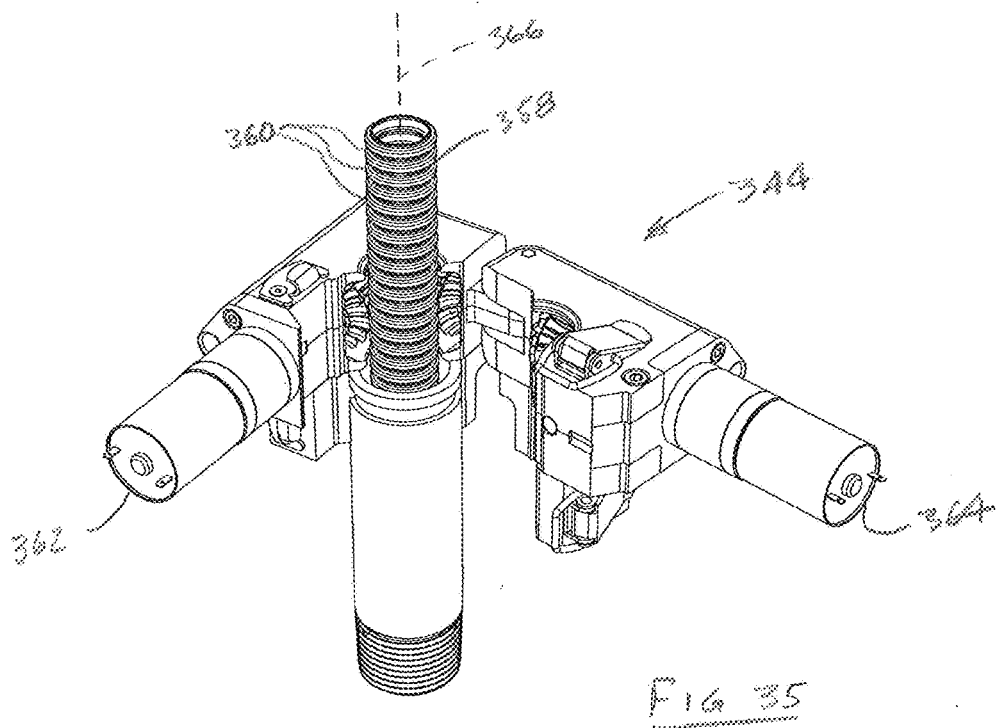
FIG. 35 shows the feeder system operating on a piece of corrugated flexible pipe.

In order to move the flexible pipe longitudinally through a service line, such as moving the PE pipe 198 through the service line 190—see FIG. 21—the service line robotic system also includes a feeder arrangement 344 as shown in FIGS. 33 and 34. The feeder arrangement 344 is configured to engage flexible pipe, such as the PE pipe 198, and it is operable to move the flexible pipe longitudinally. The feeder arrangement 344 includes two hinged portions 346, 348, which can be opened and closed to provide easy access for an adapter 350, which will guide the flexible pipe. The feeder arrangement 344 includes drive wheels 352, 354 in the first portion 346, and drive wheels 356 and one other drive wheel not visible in FIG. 34 in the second portion 348. In this embodiment, the drive wheels 352, 354, 356 have generally concave teeth. In FIG. 35, one type of flexible pipe 358 is shown, and includes convex ridges 360 that are engaged by the toothed wheels 352, 354, 356.

Figure 24:
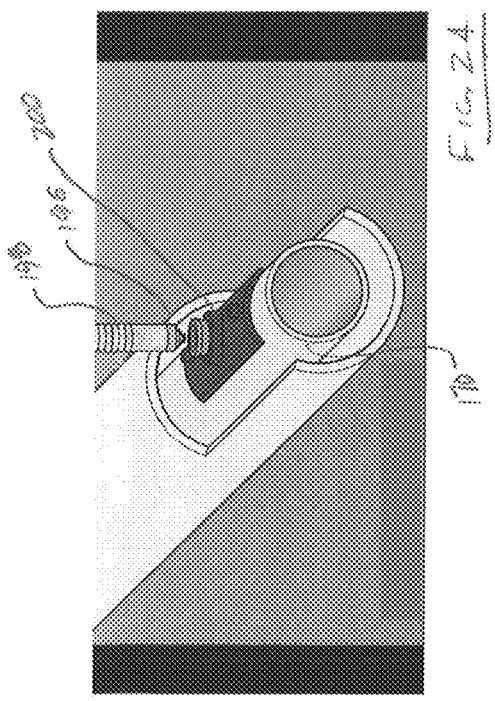
FIG. 24 shows the robotic device making a connection with the fitting that was previously fused to the PE pipe inserted into the gas main.

Drive motors 362, 364 respectively provide power to the first and second portions 346, 348 for rotating the wheels 352, 354, 356 to move the flexible pipe 358 longitudinally through, for example, a service line. The flexible pipe 358 includes a longitudinal centerline 366. When an actuator head arrangement, such as the actuator head arrangement 270 is inserted into the flexible pipe 358, the actuator head arrangement and the end of the flexible pipe 358 will have a common longitudinal centerline. As the actuator head arrangement 270 is steered around the various bends and turns by the control system 304, the end of the flexible pipe 358 will be steered along with it. Thus, the feeder arrangement 344 provides longitudinal movement while the control system 304 provides articulation in other directions such that the end of the flexible pipe 358 can be inserted into a fitting and a main pipeline pipe liner, such as shown in FIG. 24. In this way, robotic measurement system and service line robotic system may be used together to line the inside of pipelines and service lines with minimal excavation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for measuring distance in a pipeline, comprising:
    a) disposing a first subsystem of a robotic measuring system into the pipeline at an opening in the pipeline;
    b) disposing a second subsystem of the robotic measuring system into the pipeline at a first position such that there is a line of sight between the first and second subsystems;
    c) actuating a measurement capture process by the robotic measuring system, the measurement capture process including generating a laser beam from one of the first or second subsystems and reflecting it from the other of the first or second subsystems to generate a distance measurement between the first and second subsystems;
    d) moving the first subsystem to a position closer to the second subsystem;
    e) actuating the measurement capture process;
    f) moving the second subsystem to a position away from the first subsystem such that there is a line of sight between the first and second subsystems; and
    g) actuating the measurement capture process.

2. The method of claim 1, further comprising determining a distance between the opening in the pipeline and the second subsystem by summing the distance measurement generated at step (c) and the distance measurement generated at step (g) and subtracting the distance measurement generated at step (e).

3. The method of claim 1, further comprising repeating steps (d), (e), (f), and (g) at least one time.

4. The method of claim 3, wherein in at least one iteration of step (f), the position away from the first subsystem is a position of a feature of interest in the pipeline.

5. The method of claim 4, wherein the feature of interest is a connection point of a service line.

6. The method of claim 5, further comprising attaching a fitting to liner pipe for the pipeline at a position on the liner pipe corresponding to the position of the connection point of the service line.

7. The method of claim 6, further comprising inserting the liner pipe into the pipeline until the fitting is aligned with the connection point of the service line.

8. A method for measuring distance in a pipeline, comprising:

opening the pipeline;

disposing a first subsystem of a robotic measuring system into the pipeline at a known location;

disposing a second subsystem of the robotic measuring system into the pipeline such that there is a line of sight between the first and second subsystems;

actuating a measurement capture process by the robotic measuring system to generate a distance measurement between the first and second subsystems, the measurement capture process including generating a laser beam from one of the first or second subsystems and reflecting it from the other of the first or second subsystems; and alternately moving the first and second subsystems in the same direction along a length of the pipeline and actuating the measurement capture process after each movement of the first and second subsystems.

9. The method of claim 8, further comprising mathematically combining the distance measurements generated by actuating the measurement capture process to determine a distance between the known location and the second subsystem.

10. The method of claim 8, wherein moving the second subsystem along a length of the pipeline includes at least once moving the second subsystem to be positioned at a feature of interest in the pipeline.

11. The method of claim 10, wherein the feature of interest is a connection point of a service line.

12. The method of claim 11, further comprising attaching a fitting to liner pipe for the pipeline at a position on the liner pipe corresponding to the position of the connection point of the service line.

13. The method of claim 12, further comprising inserting the liner pipe into the pipeline until the fitting is aligned with the connection point of the service line.

14. A system for measuring distance in a pipeline, comprising:

a first subsystem of a robotic measuring system including a laser generator and operable to move along an inside of the pipeline;

a second subsystem of the robotic measuring system including a reflector for reflecting a laser generated by the first subsystem and operable to move along the inside of the pipeline; and a locating arrangement attached to one of the first or second subsystems and configured to locate a feature of interest on the inside of a pipeline.

15. The system of claim 14, wherein the locating arrangement includes an elongated member positioned such that it contacts an inside wall of the pipeline as the one of the first or second subsystem moves along the inside of the pipeline.

16. The system of claim 15, wherein the elongated member has an aperture disposed therethrough configured to allow gas to pass through the aperture when the elongated member is disposed over a connection point between a service line and the pipeline.

17. The system of claim 14, wherein the reflector on the second subsystem is configured with an adjustable position to facilitate alignment with the laser generated by the first subsystem, second subsystem further including at least one photo sensor disposed proximate to the reflector to facilitate adjustment of the reflector.

18. The system of claim 14, wherein at least one of the reflector on the second subsystem or the laser generator on the first subsystem is mounted on a gimbal drive to provide an angular adjustment.

19. The system of claim 14, wherein each of the first and second subsystem includes a set of drive wheels operable to move the respective first or second subsystem along the inside of the pipeline and at least one idler wheel disposed opposite the set of drive wheels and configured to contact an opposite side of the pipeline from the set of drive wheels.

20. The system of claim 19, wherein the at least one idler wheel is adjustable away from the set of drive wheels to bring the at least one idler wheel into contact with the opposite side of the pipeline from the set of drive wheels.

* * * * *